United States Patent
Malek et al.

(10) Patent No.: US 10,740,547 B2
(45) Date of Patent: Aug. 11, 2020

(54) MANAGING DATA RELATIONSHIPS OF CUSTOMIZABLE FORMS

(71) Applicant: Allscript Software, LLC, Raleigh, NC (US)

(72) Inventors: Jonathan Mark Malek, Sacramento, CA (US); Maryam Gholami, San Francisco, CA (US); Chad Nicely, Newbury Park, CA (US); Shaun Guth, Fremont, CA (US); Lawrence Stone, San Francisco, CA (US); Priyanka Godbole, Sunnyvale, CA (US)

(73) Assignee: ALLSCRIPTS SOFTWARE, LLC, Raleigh, NC (US)

( * ) Notice: Subject to any disclaimer, the term of this patent is extended or adjusted under 35 U.S.C. 154(b) by 490 days.

(21) Appl. No.: 14/924,216

(22) Filed: Oct. 27, 2015

(65) Prior Publication Data

US 2017/0116169 A1    Apr. 27, 2017

(51) Int. Cl.
*G06F 17/24* (2006.01)
*G06F 40/174* (2020.01)
*G06F 3/0484* (2013.01)
*H04L 29/08* (2006.01)
*H04L 29/06* (2006.01)

(52) U.S. Cl.
CPC .......... *G06F 40/174* (2020.01); *G06F 3/0484* (2013.01); *H04L 67/02* (2013.01); *H04L 67/10* (2013.01); *H04L 67/143* (2013.01); *H04L 67/42* (2013.01)

(58) Field of Classification Search
CPC .............................. G06F 40/174; G06F 3/0484
See application file for complete search history.

(56) References Cited

U.S. PATENT DOCUMENTS 5,367,619 A * 11/1994 Dipaolo ............... G06F 3/0489
715/221
6,199,079 B1 * 3/2001 Gupta ................. G06F 17/2247
707/999.006

(Continued)

*Primary Examiner* — Mohammed H Zuberi
(74) *Attorney, Agent, or Firm* — Medley, Behrens & Lewis, LLC

(57) ABSTRACT

In an embodiment, a method manages data integrity of an electronic form. In the method, a request from a client device for access to the electronic form is received. Access is provided during a session to the electronic form to the client device, wherein the electronic form is configured to receive user input into fields of the electronic form via the client device, the user input comprising one or more field values corresponding to the fields of the electronic form, transmit the user input to at least one computing device, and transmit a publication request message to the at least one computing device, the publication request message indicative of an end of a session. The user input is received. During the session and before receiving the publication request message, the one or more field values of the user input is updated in a pre-publication database. The publication request is received, and in response to receiving the publication request message, a post-publication database is updated with the one or more field values stored in the pre-publication database according to a mapping of pre-publication database fields and post-publication database fields.

20 Claims, 6 Drawing Sheets

(56) References Cited

U.S. PATENT DOCUMENTS

| | | | | |
|---|---|---|---|---|
| 6,748,425 B1* | 6/2004 | Duffy | G06Q 10/10 | 709/217 |
| 6,910,179 B1* | 6/2005 | Pennell | G06F 17/243 | 715/207 |
| 7,996,589 B2* | 8/2011 | Schultz | G06F 3/04883 | 345/156 |
| 8,095,476 B2* | 1/2012 | Bierner | G06Q 99/00 | 705/500 |
| 10,169,607 B1* | 1/2019 | Sheth | G06F 21/6245 | |
| 2002/0095406 A1* | 7/2002 | McGeorge, Jr. | G06F 17/2725 | |
| 2003/0004951 A1* | 1/2003 | Chokshi | G06F 17/243 | |
| 2003/0185448 A1* | 10/2003 | Seeger | G06K 9/2054 | 382/229 |
| 2003/0188260 A1* | 10/2003 | Jensen | G06F 17/243 | 715/222 |
| 2005/0257148 A1* | 11/2005 | Goodman | G06F 17/243 | 715/226 |
| 2006/0007189 A1* | 1/2006 | Gaines, III | G06F 17/243 | 345/179 |
| 2006/0161646 A1* | 7/2006 | Chene | G06F 17/243 | 709/223 |
| 2006/0168509 A1* | 7/2006 | Boss | G06F 17/243 | 715/226 |
| 2006/0200754 A1* | 9/2006 | Kablesh | G06F 17/243 | 715/226 |
| 2006/0230033 A1* | 10/2006 | Halevy | G06F 17/243 | |
| 2007/0112599 A1* | 5/2007 | Liu | G16H 15/00 | 705/2 |
| 2008/0172598 A1* | 7/2008 | Jacobsen | G06F 17/243 | 715/224 |
| 2008/0201172 A1* | 8/2008 | McNamar | G06Q 50/24 | 705/3 |
| 2008/0235567 A1* | 9/2008 | Raj | G06F 17/243 | 715/226 |
| 2011/0202370 A1* | 8/2011 | Green, III | G06F 19/328 | 705/3 |
| 2011/0225007 A1* | 9/2011 | Theis | G16H 10/20 | 705/2 |
| 2011/0246224 A1* | 10/2011 | Green, III | G06Q 10/06 | 705/2 |
| 2011/0301977 A1* | 12/2011 | Belcher | G06Q 50/22 | 705/3 |
| 2011/0301982 A1* | 12/2011 | Green, Jr. | G06Q 10/06 | 705/3 |
| 2012/0036053 A1* | 2/2012 | Miller | G06Q 40/02 | 705/31 |
| 2012/0059668 A1* | 3/2012 | Baldock | G06Q 50/24 | 705/3 |
| 2013/0054678 A1* | 2/2013 | Williams | G06Q 10/10 | 709/203 |
| 2013/0103420 A1* | 4/2013 | Massoumi | G06Q 10/103 | 705/3 |
| 2014/0081667 A1* | 3/2014 | Joao | G06F 19/328 | 705/3 |
| 2014/0172450 A1* | 6/2014 | Repko | G16H 10/60 | 705/2 |
| 2014/0249859 A1* | 9/2014 | Lorsch | G06F 19/00 | 705/3 |
| 2014/0278532 A1* | 9/2014 | Kalathil | G06F 19/328 | 705/3 |
| 2015/0149212 A1* | 5/2015 | Rolia | G06Q 50/22 | 705/3 |
| 2015/0331997 A1* | 11/2015 | Joao | G06F 19/322 | 705/3 |
| 2015/0339441 A1* | 11/2015 | Gombert | G16H 10/60 | 705/3 |

* cited by examiner

MANAGING DATA RELATIONSHIPS OF CUSTOMIZABLE FORMS

BACKGROUND

Existing electronic data collection methods suffer from several deficiencies. Often, creating custom electronic forms requires a background in computer programming or software engineering and expertise with software creation platforms. These platforms can be incredibly cumbersome to use, even to those having the ability to use them. Moreover, it is often difficult or impractical to give developers access to proprietary information systems while maintaining the security, functionality, and integrity of those systems. These challenges have prevented information collection systems from allowing their users to create their own customized electronic forms that integrate with the systems.

BRIEF SUMMARY

In an embodiment, a method manages data integrity of an electronic form. In the method, a request from a client device for access to the electronic form is received. Access is provided during a session to the electronic form to the client device. The electronic form is configured to receive user input into fields of the electronic form via the client device, transmit the user input to at least one computing device, and transmit a publication request message to the at least one computing device. The user input comprises one or more field values corresponding to the fields of the electronic form. The publication request message is indicative of an end of a session. The user input is received. During the session and before receiving the publication request message, the one or more field values of the user input is updated in a pre-publication database. The publication request is received. In response to receiving the publication request message, a post-publication database is updated with the one or more field values stored in the pre-publication database according to a mapping of pre-publication database fields and post-publication database fields.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

FIG. 5 is an example electronic form builder.

The drawing in which an element first appears is typically indicated by the leftmost digit or digits in the corresponding reference number. In the drawings, like reference numbers can indicate identical or functionally similar elements.

DETAILED DESCRIPTION

As mentioned above, customizing electronic forms presents challenges of integrity and security. To address these issues, embodiments introduce features that integrate custom form creation into existing data collection systems. For example, some embodiments allow a form builder to create an electronic form suited to their needs. The forms can leverage commonly used standard form elements while allowing users to build their own fields, form templates, and electronic forms. Further, the electronic forms integrate into an information collection system that features two levels of storage without providing direct access to the levels of storage. A first level of storage allows the user to enter, review, and modify electronic form field entries prior to publication. A second level of storage provides information published by a user to other users that have an interest in that data. The system also enables forms to be easily created and employed via the user-friendly form builder without requiring advanced technical training of the users.

In this detailed description, references to "one embodiment", "an embodiment", "an example embodiment", etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
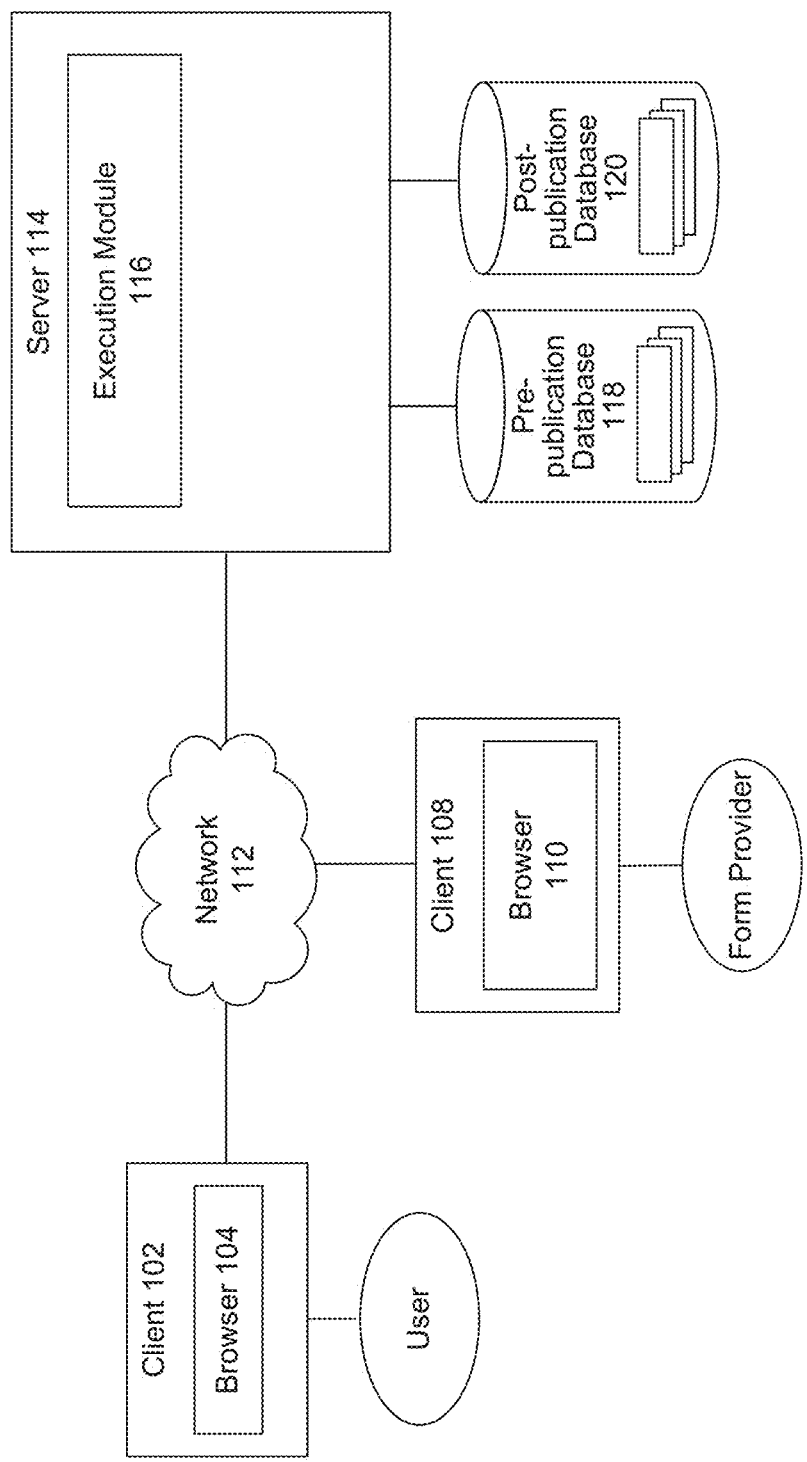
FIG. 1 is a diagram illustrating an example system for managing data relationships of customizable forms.

FIG. 1 is a diagram illustrating an example system 100 for managing data relationships of customizable forms. System 100 includes a client 102, client 108, and server 114 connected by one or more networks 112, such as the Internet. Server 114 is also coupled to two or more databases. Server 114 can be part of a comprehensive electronic health records (EHR) system, as described in further detail below.

Clients 102 and 108 can, for example, include web browsers 104 and 110, respectively, that enable a user (e.g., a patient, physician, administrator, etc.) to interact with an electronic form. For example, a user, such as a patient, can use web browser 104 to complete an electronic form prior to an appointment. Similarly, a form provider can use web browser 110 to create one or more electronic forms, which can be provided to users to solicit information. The form provider can also use web browser 110 to edit an electronic form template, review edits made to an electronic form template from another user, or control access to the electronic form template. The web browser responds to user input, such as user selection of different portions of an interface, by sending an HTTP request to server 114 via network 112. Similarly, to use, build, or manage electronic forms or electronic templates, a user or form provider can interface with clients 102 or 108 through a native application instead of a web browser, such that the native application communicates with server 114. Clients 102 or 108 can be any type of computing device, such as and without limitation, a PC, laptop, or mobile device. For example, clients 102 or 108 can be instances of the example computing system 600, which is further discussed below.

In an embodiment, an electronic form is configured to receive user input into fields of the electronic form via a client device, in which the user input comprises one or more field values corresponding to the fields of the electronic form, transmit the user input to server 114, transmit a publication request message to server 114 indicating an end of a session, transmit a save request message to server 114, or any combination thereof.

To respond to requests from clients 102 or 108, server 114 can operate as described below with regard to FIGS. 2 and 4. In the embodiment of FIG. 1, server 114 includes execution module 116, which can be configured to perform any of the methods discussed herein.

Both pre-publication database 118 and post-publication database 120 can store information entered into an electronic form. In an embodiment, pre-publication database 118 is a personal health record (PHR) database and post-publication database 120 is an EHR database. A PHR refers to a health record in which health data and information related to the care of a patient is maintained by the patient. This is in contrast to an EHR, which is not maintained by the patient. PHR and EHR databases store a plurality of different types of patients' medical records. Event-based medical records, such as records associated with physician-patient encounters can also be stored in the PHR and EHR databases.

In an embodiment, pre-publication database 118 is a document-oriented database. A document-oriented database refers to a database that is designed for storing, retrieving, and managing document-oriented information (also known as semi-structured data). Document-oriented databases are a subclass of the key-value store, and a document-oriented database uses internal structure in the document order to extract metadata that the database engine uses for further optimization. Document databases get their type information from the data itself, can store all related information together, and allow every instance of data to be different from any other. This makes them more flexible in dealing with change and optional values, maps more easily into program objects, and often reduces database size. This makes them attractive for programming modern web applications, which are subject to continual change in place, and where speed of deployment is an important issue.

In an embodiment, post-publication database 120 is a relational database. A relational database refers to a database whose organization is based on the relational model of data. This model organizes data into one or more tables (or "relations") of rows and columns, with a unique key for each row. Generally, each entity type described in a database has its own table, the rows representing instances of that type of entity and the columns representing values attributed to that instance. Because each row in a table has its own unique key, rows in a table can be linked to rows in other tables by storing the unique key of the row to which it should be linked. In a relational database, relationships of arbitrary complexity can be represented using this simple set of concepts.

In an embodiment, post-publication database 120 is an event bus that can be subscribed to by any number of interested parties. The execution module 116 can publish data to the event bus, and the data can be persisted by any number of services.

In an embodiment, pre-publication database 118 is a document-oriented database, post-publication database 120 is a relational database, and execution module 116 has access to a mapping that maps fields from pre-publication database 118 to post-publication database 120. Alternatively or additionally, execution module 116 has access to a mapping of fields between an electronic form and pre-publication database 118, post-publication database 120, or any combination thereof.

In an embodiment, pre-publication database 118 and post-publication database 120 can be any type of structured data store. FIG. 1 shows that post-publication database 120 and pre-publication database 118 reside on two separate database platforms. In other embodiments, post-publication 120 and pre-publication database 118 can reside on the same database platform.

Management of Data Entry Using Electronic Forms

Figure 2:
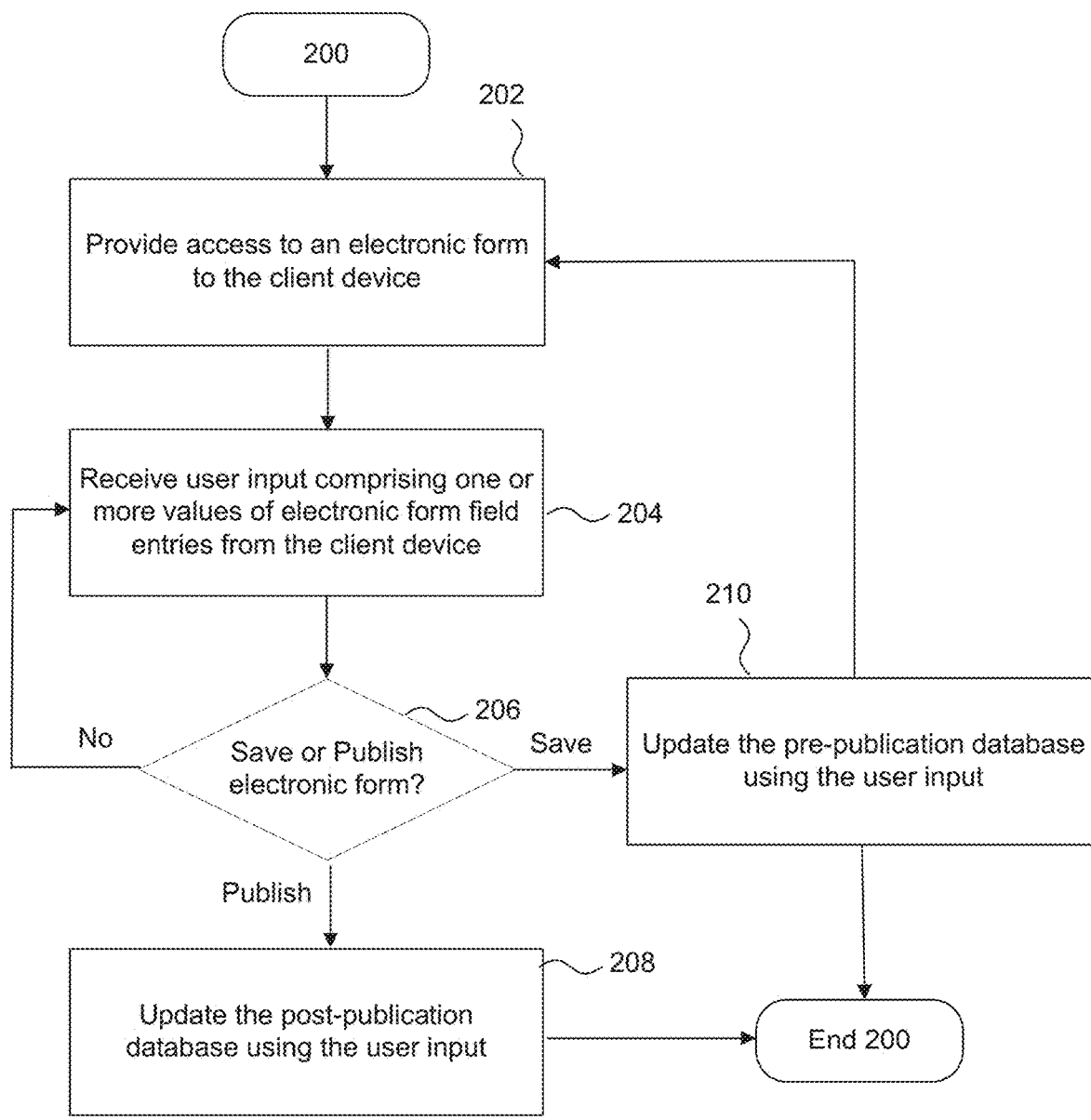
FIG. 2 is a flowchart illustrating an example method for managing data integrity of an electronic form.

FIG. 2 is a flowchart illustrating an example method 200 for managing data integrity of an electronic form. Method 200 can be performed by processing logic that can comprise hardware (e.g., circuitry, dedicated logic, programmable logic, microcode, etc.), software (e.g., instructions run on a processing device), or a combination thereof. For example, method 200 can be performed by execution module 116 of server 114 or by computing device 600.

Figure 3:
FIG. 3 is an example electronic form.

Method 200 begins at block 202, at which access to an electronic form is provided to a client device, such as client devices 102 and 108. FIG. 3 shows an example electronic form 300, in accordance with some embodiments. Access can be provided to client device 102 or client device 108 through web browsers 104 and 110, respectively, a native application, or any combination thereof. In an embodiment, access to the electronic form is provided in response to receiving by server 114 a request from a client device for access to the electronic form.

In an embodiment, server 114 can populate one or more of the fields of the electronic form with values from at least one of the pre-publication database or the post-publication database. This can help the user more efficiently fill out the forms.

At block 204, user input comprising one or more values of electronic form field entries are received from the client device. The user input can include adding, deleting, or modifying values from fields of the electronic form.

At block 206, it is determined whether to save form information, publish form information, or continue processing without saving or publishing form information. If it is determined to continue processing without saving or publishing form information, method 200 proceeds to block 204. If it is determined to publish form information, method 200 proceeds to block 208. If it is determined to save form information, method 200 proceeds to block 210. There are several ways in which the determinations made at block 206 can be made.

In an embodiment, server 114 receives a save request message transmitted by a client device 102 or 108. A save request message indicates that server 114 should update the information in pre-publication database 118 with the changes made to the electronic form. In an embodiment, a user can explicitly request that the client device sends a save request message to server 114 by interacting with an element of the electronic form, such as by activating the save button 304 of electronic form 300. Alternatively or additionally, the client device can send one or more save request messages to server 114 without receiving explicit instructions from the user to do so. For example, client device can send one or more save request messages in response to values of the electronic form's fields changing, a certain amount of time elapsing, or any combination thereof.

In an embodiment, server 114 receives a publication request message transmitted by a client device 102 or 108. A publication request message indicates that server 114 should update the information in post-publication database 118 with the changes made to the electronic form. A publication request message also indicates the end of the session currently in process by the user. In an embodiment, a user can explicitly request that the client device sends a publication request message to server 114 by interacting with an element of the electronic form, such as by activating the publish button 306 of electronic form 300. Alternatively or additionally, the client device can send one or more publication request messages to server 114 without receiving explicit instructions from the user to do so. For example, client device can send one or more publication request messages in response to values of the electronic form's fields changing, a certain amount of time elapsing, or any combination thereof.

In an embodiment, server 114 determines to continue processing without saving or publishing form information without receiving any save request messages or publication request messages corresponding to the electronic form from the client device.

At block 208, post-publication database 120 can be updated using the user input. For example, server 114 can update post-publication database 120 by transferring the one or more field values stored in the pre-publication database 118 according to a mapping of fields of pre-publication database 118 and fields of post-publication database 120. Alternatively or additionally, fields in the post-publication database 120 can be mapped to fields in the electronic form. Method 200 can then end. Alternatively, method 200 could continue to block 202 to begin another session.

At block 210, pre-publication database 118 can be updated using the user input. For example, server 114 can update values in pre-publication database 118 with the values entered by the user in the electronic form's fields. Fields in the pre-publication database 118 can be mapped to fields in the electronic form. In this manner, a user can make several changes to the electronic form field data before the information is published to post-publication database 120.

In an embodiment, a user can continue to edit the electronic form fields after the information is published to the post-publication database 120. For example, server 114 can receive a second request for access to the electronic form after a first session has ended. The second server can provide access to the electronic form to the client device during a second session. During the second session, the server 114 can receive a second user input from the client device, the second user input including a second one or more field values corresponding to the fields of the electronic form. Server 114 can update the second one or more field values in the pre-publication database 118 with the corresponding user input during the second session and before receiving a second publication.

While in the second session (or any subsequent session), server 114 can receive a second publication request message transmitted by the client device. Server 114 can determine whether or not any changes made to the field values are propagated to the post-publication database 120. In an embodiment, if the second publication request message is received before a predetermined time, server 114 updates the post-publication database with the second one or more field values stored in the pre-publication database. Otherwise, if the second publication request message is not received before the predetermined time, the second publication request message can be disregarded. A predetermined period of time can be set based on various factors. For example, the predetermined period of time can be the time of an appointment for which the electronic form values are to be used.

In an embodiment, a user cannot continue to edit values of the electronic form fields after the information is published to the post-publication database 120. Another user, such as an administrator, can subsequently allow the user to edit the electronic form values.

FIG. 3 is an example electronic form 300, according to some embodiments. Electronic form 300 includes fields 302, save button 304, publish button 306, and non-editable information 308. Electronic form can be used by system 100 or method 200 or created or modified by method 400.

Electronic Form Builder

Figure 4:
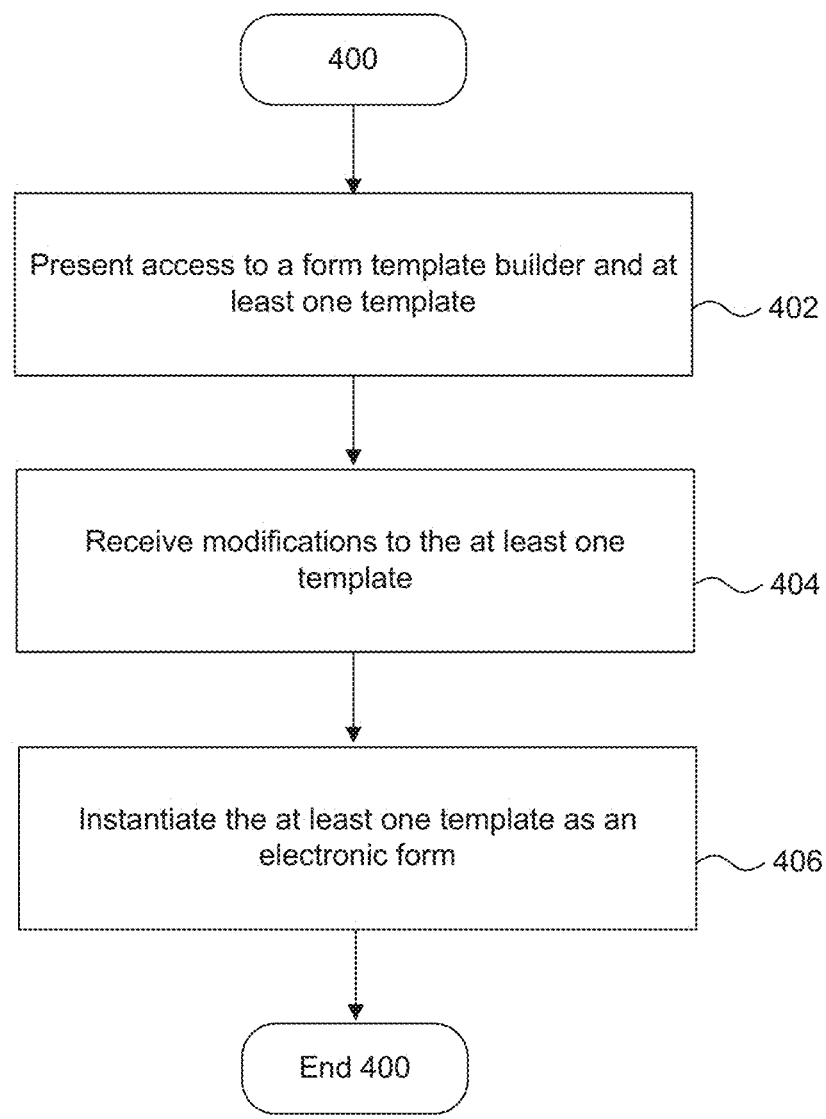
FIG. 4 is a flowchart illustrating an example method for building an electronic form.

FIG. 4 is a flowchart illustrating an example method for building an electronic form. Method 400 can be performed by processing logic that can comprise hardware (e.g., circuitry, dedicated logic, programmable logic, microcode, etc.), software (e.g., instructions run on a processing device), or a combination thereof. For example, method 400 can be performed by execution module 116 of server 114 or by computing device 600.

Figure 5:
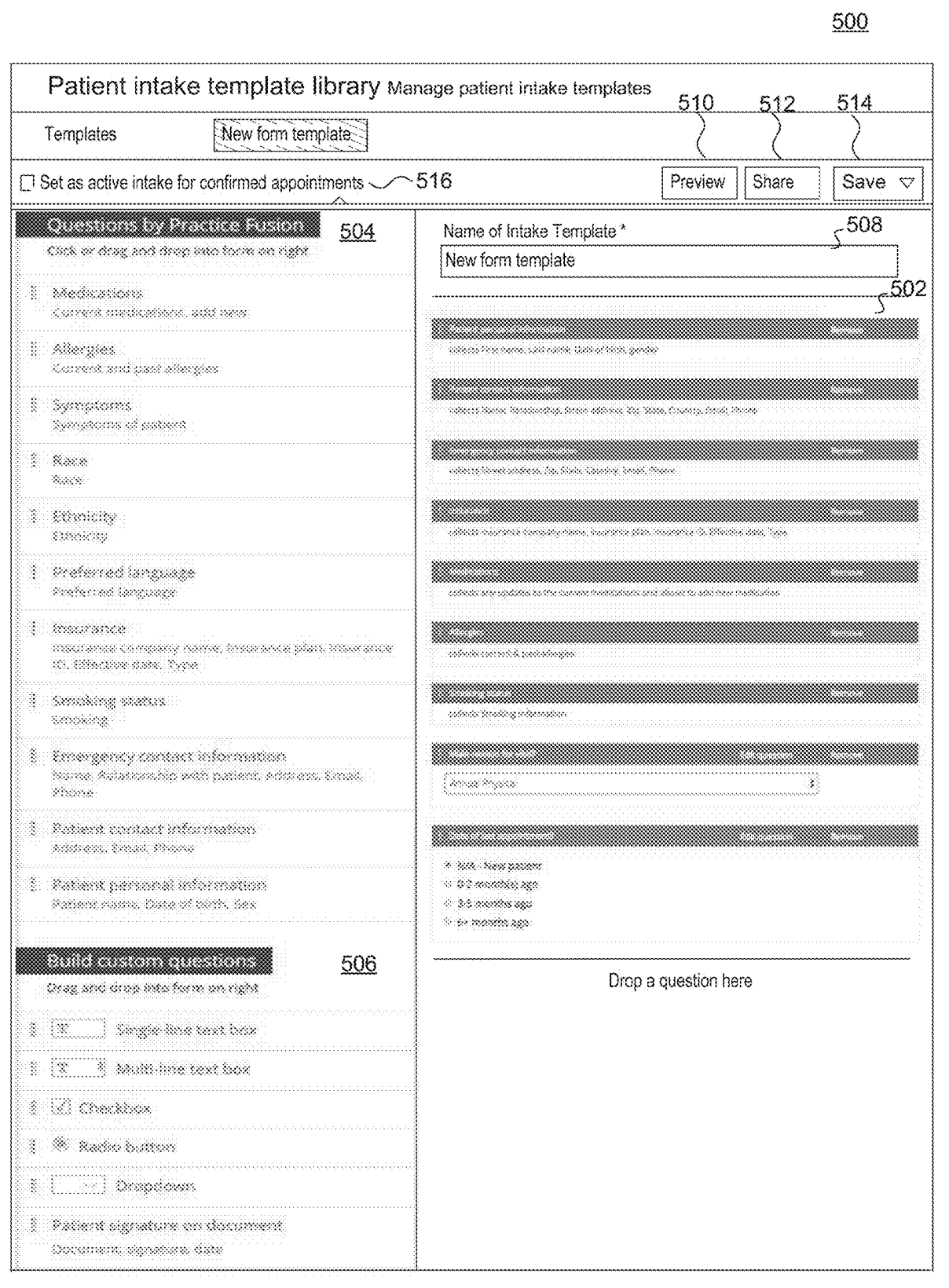

Method 400 begins at block 402, at which access to an electronic form template builder and at least one template is provided to a client device, such as client device 108. FIG. 5 shows an example electronic form builder 500 that includes an example template 502.

At block 404, modifications to the at least one template are received. The modifications can include naming the template, adding items to the template, removing items from the template, and modifying items in the template. For example, a user can drag items from standard controls 504 or from custom controls 506 of electronic form builder 500 into the template area 502 to add items to the template. Items can be removed from the template by activating a remove link of template items or edited by activating an edit link of template items.

At block 406, the template is instantiated as an electronic form. For example, the template can instantiated as an electronic form and used by system 100 or in the method 200.

In an embodiment, the user can preview the electronic form specified by the template. The user can do so by activating a preview button of the electronic form builder, such as a preview button 510 in FIG. 5.

In an embodiment, one or more templates can be shared. For example, a second form builder can be provided access to a template completed by another form builder. The system is capable of providing several types of access, which can be based on the system settings, user preferences, or any combination thereof. The types of access provide different levels of interaction with the template and/or other users. For example, a user can be provided with a static copy of the template, interactive access to a shared copy of the template, or direct access to the template. A user can use a shared template as the basis for creating a separate template. When a user uses a shared template, the template creator can make edits to the template. Those edits are reflected whenever other users access the shared template.

In an embodiment, a template creator can terminate another user's continued access to the template. For example, when a user is provided with a shared copy of the template. When the access is terminated, the user's copy can exist as a separate instantiation apart from the original template, or the user's copy can be expunged.

FIG. 5 is an example electronic form builder 500, in accordance with some embodiments. Electronic form builder 500 includes template area 502, standard controls 504, custom controls 506, template name field 508, preview button 510, share button 512, save button 514, and a checkbox to set as active for confirmed appointments 516. Standard controls 504 are controls whose values are mapped to common data fields of system 100. For example, standard controls 504 can map to data fields of an EHR common across various EHR records. Standard controls can include mappings of one or more fields that include, for example, medications (e.g., current medications, add new medications), allergies (e.g., current and past allergies), symptoms (e.g., symptom of a patient), race, ethnicity, preferred language, insurance (e.g. insurance company name, insurance plan, insurance identifier, effective date, type), smoking status (e.g., smoking or non-smoking), emergency contact information (e.g., name, relationship with patient, address, email, and phone), patient contact information (e.g., address, email, and phone), and patient personal information (e.g., patient name, date of birth, sex). Custom controls 506 are controls in which a user can create questions not already existing in standard controls 504. In an embodiment, custom controls not mapped to data fields of system 100 common other records associated with other users. Custom controls 506 can include, for example, a single-line text box, a multi-line text box, a checkbox, a radio button, a dropdown, or a patient signature on document field (including, e.g., a document, signature, and date). Each of the controls can allow a user to enter the information into an electronic form instantiated from the template.

In an embodiment, method 400 or electronic form builder 500 is used to build an electronic form used for patient intake. For example, one or more users can build the electronic form to solicit information about a patient before the patient's appointment with a healthcare provider. The one or more users can be any combination of a doctor, an administrator, the healthcare provider, another healthcare provider, etc.

In an embodiment, the electronic form can be made available to the patient ahead of the appointment as a patient intake form. For example, the electronic form can be made available to the patient when the appointment is scheduled, when a reminder for the appointment is sent to the patient, when the patient arrives at a facility for the appointment, when the patient is at the appointment location and is waiting for the appointment to begin, when a patient accesses a comprehensive EHR system or patient portal, or any combination thereof.

In an embodiment, an electronic form used for patient intake, which can be created using method 400 or electronic form builder 500, is provided to the patient as electronic form 300 or using method 200. As discussed above, the patient can interact with the form to enter information solicited by the form. The patient can complete the electronic form during a single session or over multiple sessions. The electronic form can save the patient's input to the form in response to an explicit request from the patient or without such a request. The electronic form can be saved to the patient's PHR. The patient can also publish the electronic form, at which point, the electronic form is saved to an EHR.

In an embodiment, the patient can edit the electronic form after it has been published (e.g., published to an EHR) but before the patient's appointment. Alternatively, the patient can be prevented from editing the form after it has been published.

Although the foregoing provides examples of a patient interacting with the electronic form, it is to be understood that another user, such as someone acting on the patient's behalf, can interact with the form in the same ways.

Example Computing Device

Figure 6:
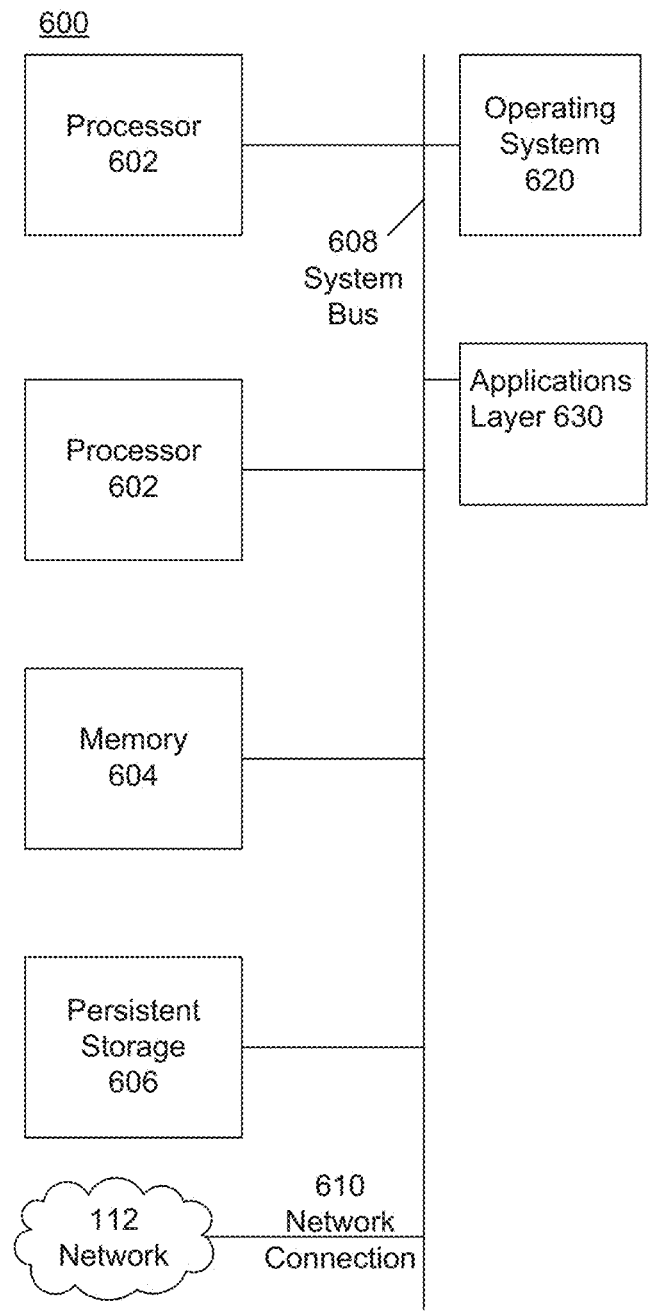
FIG. 6 is a diagram illustrating an example computing device.

An example computing device is illustrated in FIG. 6. FIG. 6 is a diagram illustrating a computing device 600 that accesses a network 112 over a network connection 610 that provides computing device 600 with telecommunications capabilities. Computing device 600 uses an operating system 620 as software that manages hardware resources and coordinates the interface between hardware and software.

In an embodiment, computing device 600 contains a combination of hardware, software, and firmware constituent parts that allow it to run an applications layer 630. Computing device 600, in embodiments, can be organized around a system bus 608, but any type of infrastructure that allows the hardware infrastructure elements of computing device 600 to communicate with and interact with each other can also be used.

Processing tasks in the embodiment of FIG. 6 are carried out by one or more processors 602. However, it should be noted that various types of processing technology can be used here, including multi-core processors, multiple processors, or distributed processors. Additional specialized processing resources such as graphics, multimedia, or mathematical processing capabilities can also be used to aid in certain processing tasks. These processing resources can be hardware, software, or an appropriate combination thereof. For example, one or more of processors 602 can be a graphics-processing unit (GPU). In an embodiment, a GPU is a processor that is a specialized electronic circuit designed to rapidly process mathematically intensive applications on electronic devices. The GPU can have a highly parallel structure that is efficient for parallel processing of large blocks of data, such as mathematically intensive data common to computer graphics applications, images and videos.

To manipulate data in accordance with embodiments describe herein, processors 602 access a memory 604 via system bus 603. Memory 604 is non-transitory memory, such as random access memory (RAM). Memory 604 can include one or more levels of cache. Memory 604 has stored therein control logic (i.e., computer software) and/or data. For data that needs to be stored more permanently, processors 302 access persistent storage 606 via system bus 608. Persistent storage 606 can include, for example, a hard disk drive and/or a removable storage device or drive. A removable storage drive can be an optical storage device, a compact disc drive, flash memory, a floppy disk drive, a magnetic tape drive, tape backup device, and/or any other storage device/drive.

Processors 602, memory 604, and persistent storage 606 cooperate with operating system 620 to provide basic functionality for computing device 600. Operating system 620 provides support functionality for applications layer 630.

Network connection 610 enables computer device 600 to communicate and interact with any combination of remote devices, remote networks, remote entities, etc. For example, network connection 610 can allow computer device 600 to communicate with remote devices over network 112, which can be a wired and/or wireless network, and which can include any combination of LANs, WANs, the Internet, etc. Control logic and/or data can be transmitted to and from computer device 300 via network connection 310.

Applications layer 630 can house various modules and components. For example, execution module 116 can be included in applications layer 630 when computing device 600 is used as server 114.

It should be noted that computer-readable medium embodiments can include any physical medium which is capable of encoding instructions that can subsequently by used by a processor to implement methods described herein. Example physical media can include floppy discs, optical discs (e.g. CDs, mini-CDs, DVDs, HD-DVD, Blu-ray), hard drives, punch cards, tape drives, flash memory, or memory chips. However, any other type of tangible, persistent storage that can serve in the role of providing instructions to a processor can be used to store the instructions in these embodiments.

Comprehensive EHR System

A comprehensive EHR system includes a variety of components. Components of EHR systems vary from vendor to vendor and from setting to setting. For example, an EHR system in which embodiments of the present invention can be used can also include, but not be limited to: (1) an electronic prescription (eRx) component, (2) a clinical and radiology laboratory component, (3) a transfer of care component, (4) a scheduling component, (5) a billing service component, and (6) patient portal component.

The electronic prescription component provides medical professionals capabilities to electronically generate and transmit prescriptions for patients' medications. Some EHR systems enable prescribers to view their patients' prescription benefit information at the point of care and select medications that are on formulary and covered by the patient's drug benefit. This informs physicians of potential lower cost alternatives (such as generic drugs) and reduces administrative burden of pharmacy staff and physicians related to benefit coverage.

The clinical and radiology laboratory component allows medical professionals to integrate with clinical laboratories to electronically receive and incorporate clinical laboratory tests and results into a patient's chart and create computerized provider order entry ("CPOE") clinical laboratory orders. This component can also support functionality that enables medical professionals to electronically receive and incorporate radiology laboratory test results (e.g., x-ray, ultrasound, MRI, PET/CT scan, mammography) into a patient's chart.

Medical professionals can use the transfer of care component to transmit referrals electronically to other EHR users or to non-users by fax. Additionally, some EHR systems support electronically creating and transmitting consolidated continuity of care documents.

The scheduling component offers functionality that allows healthcare providers to manage their appointments with an electronic schedule that can be integrated into a practice's workflow.

The billing service component offers medical professionals the ability to electronically generate and transmit superbills. Superbills are the data source for the creation of a healthcare claim. The billing service component can transmit superbills to medical billing software accounts controlled by the professionals' offices or their billing service providers. This component also allows a healthcare professional to save a superbill and transmit it to the health care professional's billing account with the billing software vendor.

The patient portal component allows medical professionals to grant their patients an online means to view, download, and transmit their health information, often called the personal health record (PHR). This component also provides patients with the ability to review their physicians and send and receive secure messages directly to and from their physicians.

Together, these components leverage the benefits of EHRs while mitigating the risks.

CONCLUSION

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for managing data integrity of an electronic form that includes health information for a patient that is to be used in an appointment of the patient with a healthcare provider, the method comprising:
   receiving, by a server computing device and prior to the appointment, a request from a client device for access to the electronic form, the client device being operated by the patient, wherein the server device is a part of an electronic health records (EHR) system;
   providing, by the server device, access to the electronic form to the client device during a session between the server device and the client device;
   subsequent to providing access to the electronic form to the client device and during the session, receiving from the client device an indication that user inputs in fields of the electronic form are to be saved in a personal health record (PHR) database, wherein the PHR database includes first health information maintained by the patient, and further wherein the PHR database is a document-oriented database;
   updating, by the server device during the session, the PHR database to include the user inputs;
   subsequent to updating the PHR database to include the user inputs, receiving, by the server device, an indication that the patient has requested to end the session between the server device and the client device; and
   in response to receiving the indication that the patient has requested to end the session between the server device and the client device transferring the user inputs stored in the PHR database to an EHR database according to a mapping between fields of the PHR database and fields of the EHR database, wherein the EHR database includes second health information that is not maintained by the patient, and further wherein the EHR database is a relational database, wherein the user inputs stored in the EHR database are presented on a display of a second client device operated by the healthcare provider during the appointment of the patient.

2. The method of claim 1, further comprising:
prior to receiving the indication that the patient has requested to end the session between the server device and the client device, populating a field in the fields of the electronic form with values from at least one of the PHR database or the EHR database.

3. The method of claim 1, further comprising:
updating the PHR database with values from the EHR database.

4. The method of claim 1, further comprising:
receiving, by the server device, a second request from the client device for access to the electronic form after the session has ended;
providing, by the server device, access to the electronic form to the client device during a second session between the server device and the client device;
subsequent to providing access to the electronic form to the client device and during the second session, receiving, from the client device, a second indication that second user inputs in second fields of the electronic form are to be saved in the PHR database; and
updating, by the server device and during the second session, the PHR database to include the second user inputs.

5. The method of claim 4, further comprising:
subsequent to updating the PHR database to include the second user inputs, receiving, by the server device, an indication that the patient has requested to end the second session between the server device and the client device;
if the indication that the patient has requested to end the second session between the server device and the client device is received by the server device before a predetermined time, transferring the second user inputs stored in the PHR database to the EHR database according to the mapping; and
if the indication that the patient has requested to end the second session between the server device and the client device is not received by the server device before the predetermined time, failing to transfer the second user inputs stored in the PHR database to the EHR database.

6. The method of claim 1, wherein the EHR database is an event bus that is subscribed to by a plurality of parties.

7. The method of claim 1, wherein the PHR database is disposed on a first database platform and the EHR database is disposed on a second database platform.

8. A server device for managing data integrity of an electronic form that includes health information for a patient that is to be used in an appointment of the patient with a healthcare provider, the server device comprising:
memory storing instructions; and
a processor coupled to the memory that, when executing the instructions, performs acts comprising:
prior to the appointment, receiving a request from a client device for access to the electronic form, the client device being operated by the patient, wherein the server device is part of an electronic health record (EHR) system;
providing access to the electronic form to the client device during a session between the server device and the client device;
subsequent to providing access to the electronic form to the client device and during the session, receiving from the client device an indication that user inputs in fields of the electronic form are to be saved in a personal health record (PHR) database, wherein the PHR database includes first health information maintained by the patient, and further wherein the PHR database is a document-oriented database;
during the session, updating the PHR database to include the user inputs;
subsequent to updating the PHR database to include the user inputs, receiving an indication that the patient has requested to end the session between the server device and the client device; and
in response to receiving the indication that the patient has requested to end the session between the server device and the client device, transferring the user inputs stored in the PHR database to an EHR database according to a mapping between fields of the PHR database and fields of the EHR database, wherein the EHR database includes second health information that is not maintained by the patient, and further wherein the EHR database is a relational database, wherein the user inputs stored in the EHR database are presented on a display of a second client device operated by the healthcare provider during the appointment of the patient.

9. The server device of claim 8, the acts further comprising:
prior to receiving the indication that the patient has requested to end the session between the server device and the client device, populating a field in the fields of the electronic form with values from at least one of the PHR database or the EHR database.

10. The server device of claim 8, the acts further comprising:
updating the PHR database with values from the EHR database.

11. The server device of claim 8, the acts further comprising:
receiving a second request for access to the electronic form from the client device after the session has ended;
providing access to the electronic form to the client device during a second session between the server device and the client device;
subsequent to providing access to the electronic form to the client device and during the second session, receiving, from the client device, a second indication that second user inputs in second fields of the electronic form are to be saved in the PHR database; and
during the second session, updating the PHR database to include the second user inputs.

12. The server device of claim 11, the acts further comprising:
subsequent to updating the PHR database to include the second user inputs, receiving an indication that the patient has requested to end the second session between the server device and the client device;
if the indication that the patient has requested to end the second session between the server device and the client device is received before a predetermined time, transferring the second user inputs stored in the PHR database to the EHR database according to the mapping; and
if the indication that the patient has requested to end the second session between the server device and the client device is not received before the predetermined time, failing to transfer the second user inputs stored in the PHR database to the EHR database.

13. The server device of claim 8, wherein the EHR database is an event bus that is subscribed to by a plurality of parties.

14. The server device of claim 8, wherein the PHR database is disposed on a first database platform and the EHR database is disposed on a second database platform.

15. A program storage device tangibly embodying a program of instructions executable by a processor of a server device to manage data integrity of an electronic form that includes health information for a patient that is to be used in an appointment of the patient with a healthcare provider, the instructions, when executed by the processor, cause the processor to perform acts comprising:
receiving, prior to the appointment, a request from a client device for access to the electronic form, the client device being operated by the patient, wherein the server device is part of an electronic health records (EHR) system;
providing access to the electronic form to the client device during a session between the server device and the client device;
subsequent to providing access to the electronic form to the client device and during the session, receiving from the client device an indication that user inputs in fields of the electronic form are to be saved in a personal health record (PHR) database, wherein the PHR database includes first health information maintained by the patient, and further wherein the PHR database is a document-oriented database;
during the session, updating the PHR database to include the user inputs;
subsequent to updating the PHR database to include the user inputs, receiving an indication that the patient has requested to end the session between the server device and the client device; and
in response to receiving the indication that the patient has requested to end the session between the server device and the client device, transferring the user inputs stored in the PHR database to an EHR database according to a mapping between fields of the PHR database and fields of the EHR database, wherein the EHR database includes second health information that is not maintained by the patient, and further wherein the EHR database is a relational database, wherein the user inputs in the EHR database are presented on a display of a second client device operated by the healthcare provider during the appointment of the patient.

16. The program storage device of claim 15, the acts further comprising:
prior to receiving the indication that the patient has requested to end the session between the server device and the client device, populating a field in the fields of the electronic form with values from at least one of the PHR database or the EHR database.

17. The program storage device of claim 15, the acts further comprising:
updating the PHR database with values from the EHR database.

18. The program storage device of claim 15, the acts further comprising:
receiving a second request for access to the electronic form from the client device after the session has ended;
providing access to the electronic form to the client device during a second session between the server device and the client device;
subsequent to providing access to the electronic form to the client device and during the second session, receiving, from the client device, a second indication that second user inputs in second fields of the electronic form are to be saved in the PHR database; and
during the second session updating the PHR database to include the second user inputs.

19. The program storage device of claim 18, the acts further comprising:
subsequent to updating the PHR database to include the second user inputs, receiving an indication that the patient has requested to end the second session between the server device and the client device;
if the indication that the patient has requested to end the second session between the server device and the client device is received before a predetermined time transferring the second user inputs stored in the PHR database to the EHR database according to the mapping; and
if the indication that the patient has requested to end the second session between the server device and the client device is not received before the predetermined time, failing to transfer the second user inputs stored in the PHR database to the EHR database.

20. The program storage device of claim 15, wherein the EHR database is an event bus that is subscribed to by a plurality of parties.

* * * * *